(12) United States Patent
Venkatachalam

(10) Patent No.: US 8,005,487 B2
(45) Date of Patent: Aug. 23, 2011

(54) TECHNIQUES FOR OPTIMIZATION OF LOCATION DETERMINATION IN WIRELESS NETWORK

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 12/033,931

(22) Filed: Feb. 20, 2008

(65) Prior Publication Data

US 2008/0310386 A1   Dec. 18, 2008

Related U.S. Application Data

(60) Provisional application No. 60/943,871, filed on Jun. 14, 2007.

(51) Int. Cl.
*H04W 24/00* (2009.01)
(52) U.S. Cl. .............. 455/456.1; 455/456; 370/328; 370/337
(58) Field of Classification Search .......... 370/328, 370/337, 338, 345; 455/404.2, 456, 456.1, 455/456.5, 517
See application file for complete search history.

(56) References Cited

U.S. PATENT DOCUMENTS

| 6,097,958 | A | 8/2000 | Bergen |
| 6,473,619 | B1 | 10/2002 | Kong et al. |
| 2003/0016174 | A1 | 1/2003 | Anderson |
| 2004/0072582 | A1* | 4/2004 | Aljadeff et al. ............ 455/456.1 |
| 2004/0102198 | A1 | 5/2004 | Diener et al. |
| 2006/0215618 | A1 | 9/2006 | Soliman et al. |
| 2006/0292989 | A1* | 12/2006 | Gerlach et al. .............. 455/63.1 |
| 2007/0230394 | A1* | 10/2007 | Wang et al. .................. 370/328 |

FOREIGN PATENT DOCUMENTS

WO   2008/157097 A1   12/2008

OTHER PUBLICATIONS

International Search Report and Written Opinion for PCT Application No. PCT/US2008/066238, Mailed on Nov. 19, 2008, 11 Pages.
International Preliminary Report on Patentability for PCT Patent Application No. PCT/US2008/066238, mailed on Dec. 30, 2009, 6 pages.

* cited by examiner

*Primary Examiner* — Kent Chang
*Assistant Examiner* — Dinh P Nguyen
(74) *Attorney, Agent, or Firm* — James S. Finn

(57) ABSTRACT

An embodiment of the present invention provides an apparatus, comprising a transceiver operable in a wireless network, wherein said transceiver is configured to optimize location determination in said wireless network by preventing scheduled uplink (UL) transmissions at a reference base station (BS) from interfering with an uplink (UL) reference signal from a mobile station (MS).

6 Claims, 1 Drawing Sheet

TECHNIQUES FOR OPTIMIZATION OF LOCATION DETERMINATION IN WIRELESS NETWORK

CROSS REFERENCE TO RELATED APPLICATIONS

The present application claims priority to U.S. Provisional Patent Application Ser. No. 60/943,871, entitled, "TECHNIQUES FOR OPTIMIZATION OF LOCATION DETERMINATION IN WIRELESS NETWORK" filed 14 Jun. 2007, by Muthaiah Venkatachalam.

BACKGROUND

Wireless networks have become pervasive throughout society. Further, the ability to determine the location of users within the wireless network has become increasingly desirable.

Thus, a strong need exists for techniques for optimization of location determination in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
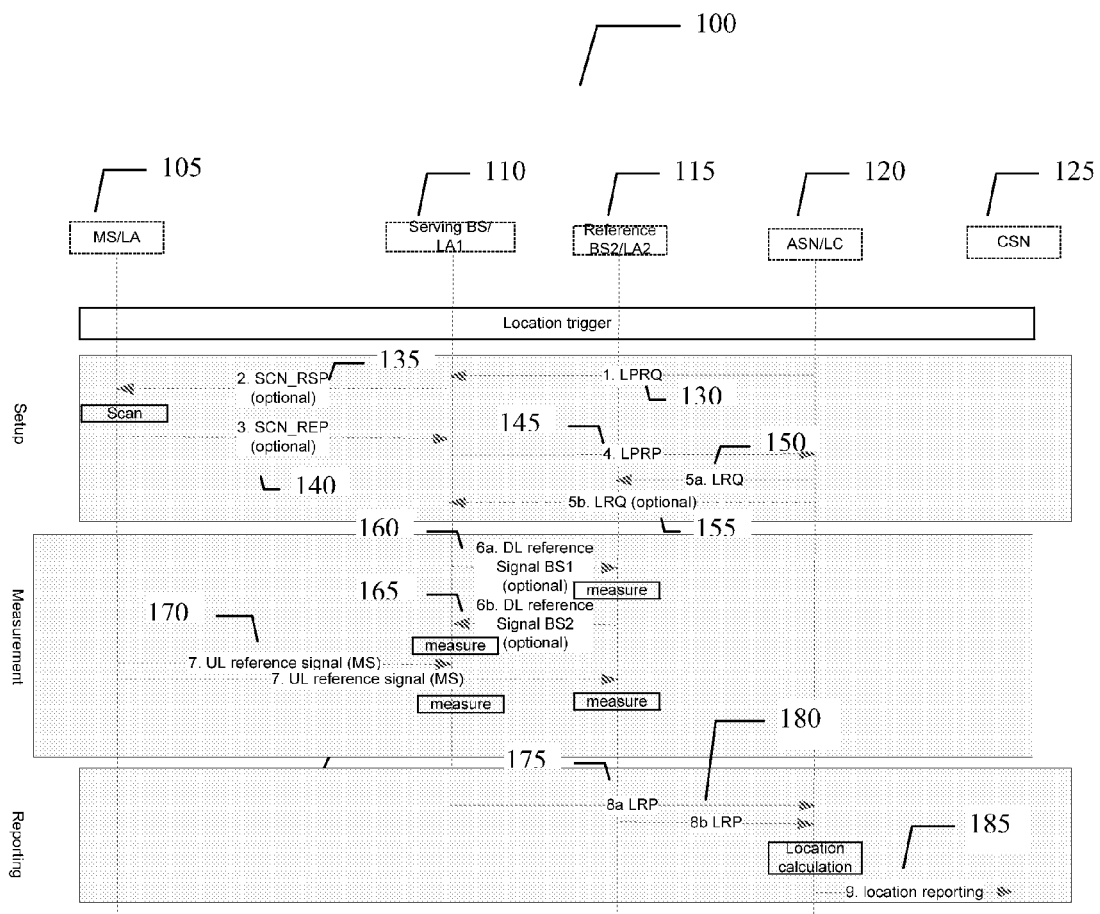
FIG. 1 provides an intra-ASN technique for network managed location determination where the network measures and makes the calculations in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Several approaches have been presented for location measurement in wireless networks such as, but not limited to, the institute for electrical and electronic engineers (IEEE) 802.16 standard (also referred to herein as WiMAX) Access Service Network Gateway (ASN). Some of these include:
  a) Uplink TDOA
  b) Downlink TDOA
  c) Downlink TOA
  d) Hybrid TDOA/TOA/RSSI etc Of these approaches one of the promising approaches is the uplink TDOA. It is supposed to work as shown as provided in FIG. 1, down generally as 100, and includes CSN 125, ASN/LC 120, reference BS2/LA2 115, Serving BS/LA1 110 and MS/LA 105.

Step 1 130: In the preparation phase before the location measurement location controller (LC) sends a LPRQ message to the serving BS requesting the parameters needed for starting the measurements. These parameters could include the set of the neighbor base stations (BSs) for this mobile station (MS) that would form the reference BSs in the location measurement, the exact symbol and frequency offsets for the reference signal from the MS that needs to be measured etc.

Step 2 135: The serving BS may in turn request the MS to scan for the best neighbors the MS sees at this point in time.

Step 3 140: The MS responds back with the scanned parameters containing the set of the reference BSs for the location calculation.

Step 4 150: the serving BS sends this back to the LC.

Step 5 155: the LC uses this information in the LRQ message sent to the reference BSes (and optionally the Serving BS).

Step 6 160 (BS1) and 165 (BS2): the reference BSs and the serving BS may measure RD from each others signals for better timing accuracy. This is an optional step.

Step 7 170: the MS transmits the uplink (UL) reference signal at the scheduled symbol and frequency offsets.

Step 8 175 and 180: the serving and reference BSs relay the measurements back to the LC.

Step 9 185: the LC reports the calculated location or the reported parameters to the LS beyond the ASN.

One of the main issues with the above scenario is that in step 7 170 when the MS sends the UL reference signal, which could be a message like RNG-REQ or a sounding sequence from the MS, this reference signal may not be decoded properly at the reference BSs other than the serving BS.

One of the main reasons for this would be the interference in the reference BS, wherein the scheduled UL transmissions at the reference BS may interfere with the UL reference signal from the MS.

An embodiment of the present invention provides optimizing this scenario by eliminating this interference so that MS location can be measured with better accuracy. The interference can be eliminated because the reference BSs know apriori from the LC during step 5 150 and 155 above, as to what symbol and frequency offset the UL reference signal transmission from the MS will take place. Hence, the UL scheduler at the reference BS can refrain from scheduling anything at this time and frequency offset so that the reference BS can be fully prepared to listen to the UL reference signal from the MS and decode/measure this signal with high fidelity.

Following this approach, in step 7 170 above, in order for the reference BSs to better measure the reference signal with minimal interference, the reference BSs may refrain from scheduling anything at this symbol and frequency offset.

Thus, embodiments of the present invention may eliminate interference on the uplink at the reference BSs during location measurement by incorporating the optimization for location determination in OFDM and Wimax networks as provided herein.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

I claim:

1. An apparatus, comprising:
a transceiver operable in a wireless network, wherein said transceiver is configured to optimize location determination in said wireless network by preventing scheduled uplink (UL) transmissions at a reference base station (BS) from interfering with an uplink (UL) reference signal from a mobile station (MS); and
wherein said reference BS knows apriori from a location controller (LC) as to what symbol and frequency offset the UL reference signal transmission from the MS will take place and thus a UL scheduler at said reference BS can refrain from scheduling anything at this time and frequency offset so that said reference BS can be fully prepared to listen to the UL reference signal from the MS and decode/measure this signal with high fidelity.

2. The apparatus of claim 1, wherein said location determination is accomplished by uplink Time Difference of Arrival (TDOA).

3. A method, comprising:
configuring a transceiver operable in a wireless network to optimize location determination in said wireless network by preventing scheduled uplink (UL) transmissions at a reference base station (BS) from interfering with an uplink (UL) reference signal from a mobile station (MS); and
knowing apriori from a location controller (LC) by said reference BS as to what symbol and frequency offset said UL reference signal transmission from the MS will take place and thus a UL scheduler at said reference BS can refrain from scheduling anything at this time and frequency offset so that said reference BS can be fully prepared to listen to the UL reference signal from the MS and decode/measure this signal with high fidelity.

4. The method of claim 3, further comprising accomplishing said location determination by uplink Time Difference of Arrival (TDOA).

5. A non-transitory machine-accessible medium that provides instructions, which when accessed, cause a machine to perform operations comprising:
configuring a transceiver operable in a wireless network to optimize location determination in said wireless network by preventing scheduled uplink (UL) transmissions at a reference base station (BS) from interfering with an uplink (UL) reference signal from a mobile station (MS); and
knowing apriori from a location controller (LC) by said reference BS as to what symbol and frequency offset said UL reference signal transmission from the MS will take place and thus a UL scheduler at said reference BS can refrain from scheduling anything at this time and frequency offset so that said reference BS can be fully prepared to listen to the UL reference signal from the MS and decode/measure this signal with high fidelity.

6. The non-transitory machine-accessible medium of claim 5, comprising further instructions, which when accessed, further comprise accomplishing said location determination by uplink Time Difference of Arrival (TDOA).

* * * * *